(12) United States Patent
Ikenaka

(10) Patent No.: US 7,710,848 B2
(45) Date of Patent: May 4, 2010

(54) OPTICAL PICKUP APPARATUS

(75) Inventor: Kiyono Ikenaka, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 606 days.

(21) Appl. No.: 11/728,811

(22) Filed: Mar. 27, 2007

(65) Prior Publication Data
US 2007/0230312 A1 Oct. 4, 2007

(30) Foreign Application Priority Data
Mar. 30, 2006 (JP) .............................. 2006-092858

(51) Int. Cl.
*G11B 7/00* (2006.01)
(52) U.S. Cl. .................................. 369/112.07; 369/121
(58) Field of Classification Search ........................ None
See application file for complete search history.

(56) References Cited

U.S. PATENT DOCUMENTS

| 2004/0047269 A1* | 3/2004 | Ikenaka et al. ......... 369/112.08 |
| 2005/0094537 A1 | 5/2005 | Ikenaka et al. |
| 2005/0249097 A1* | 11/2005 | Hashimura et al. ...... 369/112.01 |

FOREIGN PATENT DOCUMENTS

JP 2005-141800 6/2005

* cited by examiner

*Primary Examiner*—Paul Huber
(74) *Attorney, Agent, or Firm*—Cohen Pontani Lieberman & Pavane LLP

(57) ABSTRACT

The present invention provides an optical pickup apparatus including: a first light source; a second light source; and a light-converging optical system including a coupling lens and an objective lens. The coupling lens includes a first diffractive structure. The optical pickup apparatus satisfies a predetermined condition according to the chromatic aberration, focal length, and dispersion of the material.

6 Claims, 5 Drawing Sheets

OPTICAL PICKUP APPARATUS

This application is based on Japanese Patent Application No. 2006-092858 filed on Mar. 30, 2006, in Japanese Patent Office, the entire content of which is hereby incorporated by reference.

TECHNICAL FIELD

The present invention relates to an optical pickup apparatus, particularly relates to an optical pickup apparatus, which is capable of compatibly recording and/or reproducing information for different optical information recording media.

BACKGROUND

In recent years, there have been rapidly proceeded the research and development for a high-density optical disc system, which is capable of recording and/or reproducing information (hereinafter, "recording and/or reproducing" will be expressed by using following wording "recording/reproducing") by using a blue-violet laser diode having wavelength of about 400 nm. For example, there is provided an optical disc, what is called a "Blu-ray Disc" (hereinafter it will be called BD), used for recording/reproducing information based on the standard that NA (Numerical Aperture) is 0.85 and wavelength is equal to 405 nm. As for BD, information of 23-27 GB per a layer can be recorded on the optical disc having a diameter of 12 cm, which is the same size as a DVD which is used based on the standard that NA is 0.6 and wavelength of a light source is 650 nm, and whose recording capacity is 4.7 GB. There is also provided an optical disc, what is called a "HD DVD" (hereinafter it will be called HD), used for recording/reproducing information based on the standard that NA (Numerical Aperture) is 0.65 and wavelength of a light source is equal to 405 nm. As for HD, information of 15-20 GB per a layer can be recorded on the optical disc having a diameter of 12 cm. These discs are named "a high density optical disc".

On the other hand, it is sometimes considered that a product, such as an optical disc player and a recorder (hereinafter it will be called an optical disc player/recorder), which is capable of only recording/reproducing information for a high-density optical disc is worthless. Taking account of a fact that, at present, DVDs and CDs (Compact Disc), onto which various kinds of information have been recorded, are on the market, the value of the product as a high-density optical disc player/recorder is increased by, for example, enabling to appropriately record/reproduce information additionally for DVDs and CDs, which user possess. From these backgrounds, the optical pickup apparatus installed in the high-density optical disc player/recorder is required to be capable of appropriately recording/reproducing information not only for a high-density optical disc but also a DVD and a CD.

As a method for appropriately recording/reproducing information for any disc of a high-density optical disc, DVD and further CD while keeping the compatibility, it is feasible that a method of selectively switching the optical systems corresponding to the recording density of discs: the high-density optical disc, the DVD and further the CD, for which information is recorded/reproduced. However, since a plurality of optical systems is required for the method, it is disadvantageous for the minimization of the product and which increases the cost of the product.

So, it is preferable to commonly share the optical system for the high-density optical disc and the optical system for the DVD and CD as much as possible in an optical pickup apparatus having compatibility in order to simplify the structure, to decrease the cost of the optical pickup apparatus and to decrease the number of optical parts structuring the optical pickup apparatus as much as possible. Further, to commonly share the objective optical system, which is placed so as to be opposing to the optical disc, has advantages from the viewpoints of simplifying the structure and decreasing the cost of the optical pickup apparatus. In addition to this, there is a requirement that an optical detector for receiving a reflected light flux from the optical disc needs to be commonly used.

Meanwhile, Japanese Patent Application Publication Open to Public Inspection (JP-A) No. 2005-141800, has disclosed an optical pickup apparatus having a commonly used objective lens realized by inserting a divergent angle conversion element in the optical pass on which light fluxes used for DVD and CD travels.

The performances necessary for the optical system in an optical pickup apparatus depend on the respective applications in the optical pickup apparatus. For example, chromatic aberration correction is unnecessary to only read an optical disc, particularly a high-density optical disc and a DVD. However, the chromatic aberration correction is necessary to record information onto the high-density optical disc and the DVD. In the optical pickup apparatus disclosed in JP-A 2005-141800, the chromatic aberration caused when the optical pickup apparatus is used with the high-density disc and the DVD is controlled in a low level by providing a diffractive structure on the divergent angle conversion element. In general, since the dispersion characteristics of the material are different in respective wavelength ranges, the amount of the chromatic aberration of the high density disc and the amount of the chromatic aberration of the DVD are different. In the optical pickup apparatus disclosed in JP-A 2005-141800, there is provided different coupling lenses: one is the coupling lens through which a light flux for the high-density optical disc passes and the other is the coupling lens through which a light flux for the DVD/CD passes. Using the different coupling lenses to good advantage, each of the coupling lenses corrects the chromatic aberration with the corresponding amount. When a common coupling lens is used to lower the cost, there is a problem, which is how to compatibly realize the correction of the chromatic aberrations for the high-density disc and the DVD/CD is realized.

SUMMARY

An object of the present invention is to provide an optical pickup apparatus, which is capable of appropriately recording/reproducing information for different optical information recording media, while using a commonly used objective lens and a commonly used coupling lens to solve the problems associated with the prior art.

According to various embodiments, the present teachings can provide an optical pickup apparatus including: a first light source for emitting a first light flux; a second light source for emitting a second light flux; and a light-converging optical system. The light-converging optical system can include a coupling lens and an objective lens. The light-converging optical system is adopted to converge the first light flux onto an information recording surface of a first optical information recording medium so that information can be recorded and/or reproduced for the first optical information recording medium, and adopted to converge the second light flux onto an information recording surface of a second optical information recording medium so that information can be recorded and/or reproduced for the second optical information recording medium. The coupling lens can comprise a first diffractive structure arranged on an area on the coupling lens where the first and second light fluxes both used for recording or reproducing information on the respective optical information recording media, pass through. The optical pickup apparatus satisfies the predetermined expressions according to a chromatic aberration and a focal length of the objective lens and a chromatic aberration and a focal length of the coupling lens.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
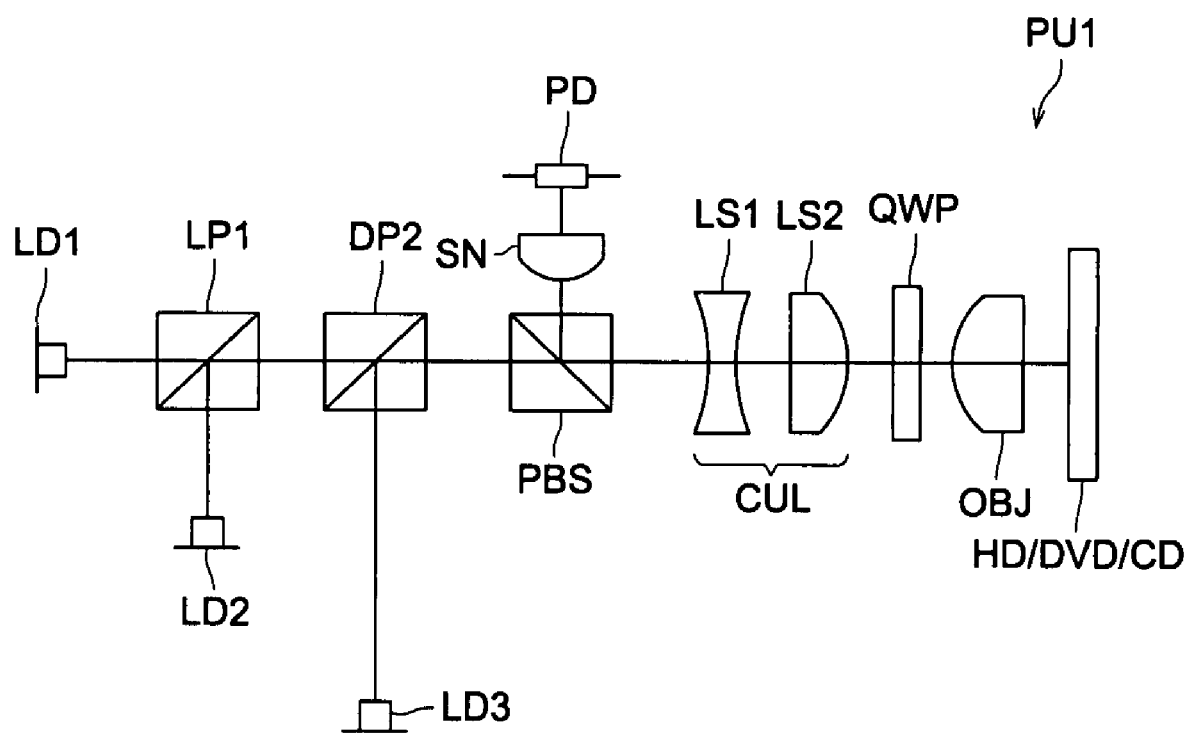
FIG. 1 illustrates a schematic diagram of an optical pickup apparatus PU1 of an embodiment of the present invention, which is capable of appropriately recording/reproducing information for different optical information recording media (they will be called optical discs), which are HD, DVD and CD.

Preferable embodiments of the present invention will be described hereinafter.

An optical pickup apparatus according to the present invention includes: a first light source for emitting a first light flux with a wavelength $\lambda 1$ (nm); a second light source for emitting a second light flux with a wavelength $\lambda 2$ (nm) satisfying $\lambda 1 < \lambda 2$; and a light-converging optical system. The light-converging optical system includes a coupling lens and an objective lens. The light-converging optical system is adopted to converge a light flux from the first light source onto an information recording surface of a first optical information recording medium through a protective layer with a thickness t1 so that information can be recorded and/or reproduced for the first optical information recording medium, and adopted to converge a light flux from the second light source onto an information recording surface of a second optical information recording medium through a protective layer with a thickness t2 (t1≦t2) so that information can be recorded and/or reproduced for the second optical information recording medium. The coupling lens includes a first diffractive structure arranged on an area on the coupling lens where the first light flux and the second light flux respectively used for recording or reproducing information on the first information recording medium and the second optical information recording medium, pass through. The first diffractive structure includes a plurality of ring-shaped zones which are concentrically arranged around the optical axis and which have steps extending along the optical axis. The optical pickup apparatus satisfies the following expressions.

$$-4.0 \times 10^{-8} \, (\text{nm}^{-1} \cdot \mu\text{m}^{-1}) \leq (\Delta fB_{OBL}/f_{OBL}{}^2) + (\Delta fB_{CPL}/f_{CPL}{}^2) \leq -1.5 \times 10^{-8} \, (\text{nm}^{-1} \cdot \mu\text{m}^{-1}) \quad (1)$$

$$5.2 \times 10^{-8} \, (\text{nm}^{-1} \cdot \mu\text{m}^{-1}) \leq \Delta fB_{OBL}/f_{OBL}{}^2 \leq 1.0 \times 10^{-7} \, (\text{nm}^{-1} \cdot \mu\text{m}^{-1}) \quad (2)$$

$$50 \leq vd_{OBL} \leq 65 \quad (3A)$$

$$50 \leq vd_{CPL} \leq 65 \quad (3B)$$

Where, $\Delta fB_{OBL}$ is a chromatic aberration ($\mu$m/nm) of the objective lens for a light flux with the wavelength $\lambda 1$, $f_{OBL}$ is a focal length ($\mu$m) of the objective lens for a light flux with the wavelength $\lambda 1$, $\Delta fB_{CPL}$ is a chromatic aberration ($\mu$m/nm) of the coupling lens for a light flux with the wavelength $\lambda 1$, $f_{CPL}$ is a focal length ($\mu$m) of the coupling lens for a light flux with the wavelength $\lambda 1$, $vd_{OBL}$ is a dispersion of the material of the coupling lens for line d, and $vd_{CPL}$ is a dispersion of the material of the coupling lens for line d.

Here, there is a reality that, in order to correct chromatic aberration on the converged spot on each optical information recording medium, it is enough that the chromatic aberration of the total light-converging optical system is corrected irrespective of the chromatic aberration of each optical element. In this case, when correcting the chromatic aberration for the light flux with the wavelength of $\lambda 1$, the chromatic aberration of the total light-converging optical system can be controlled in a low level by combining the chromatic aberration correction by the diffractive structure in the coupling lens and the chromatic aberration correction by, for example, the diffractive structure in the objective lens. The chromatic aberration correction by the diffractive structure in the objective lens includes the case that there is zero amount of aberration correction, namely, there is no diffractive structure on the objective lens. Here, "a coupling lens" denotes an optical element having a light-converging function, which is disposed in the optical path from the first light source to the objective lens and in the optical path from the second light source to the objective lens. "A light-converging optical system" denotes an optical system having a function for converging a light flux in the range from the light source to the information recording medium, which does not include a light-converging optical element provided in front of an optical detector in the optical path back to the photo-detector, namely, the light-converging optical system does not include a light-converging optical element through which the light flux from the light source does not pass.

Here, the inventor has found the way to minimize the chromatic aberration difference between the light flux with the wavelength of $\lambda 1$ and the light flux with the wavelength of $\lambda 2$ (or to make the chromatic aberration difference zero), when there are several combinations for combining a coupling lens with an objective lens which are suitable for controlling the chromatic aberration of the total light-converging optical system for the light flux having wavelength of $\lambda 1$ in a low level. In order to minimize the above chromatic aberration difference, the diffraction power of the diffractive structure on the coupling lens for correcting the chromatic aberration should be set large and the diffraction power of the objective lens for correcting the chromatic aberration should be set small (or zero), since the chromatic aberrations of the respective optical systems for the light flux having wavelength of $\lambda 2$ are different. The present invention has been achieved based on this fact described above. Namely, according to an embodiment of the present invention, when forming the coupling lens and the objective lens by the material satisfying the expression (3A) and (3B), the chromatic aberration for the light flux having wavelength of $\lambda 2$ can be corrected by determining the combination of ($\Delta fB_{OBL}/f_{OBL}^2$) and ($\Delta fB_{CPL}/f_{CPL}^2$) so as to satisfy the expression (1), to correct the chromatic aberration of the combined optical system for the wavelength of λ1, further, by determining $\Delta fB_{OBL}/f_{OBL}^2$ so as to satisfy the expression (2). This embodiment particularly becomes effective for the optical pickup apparatus, which is capable of recording information onto the second optical information recording medium. It is preferable that the absolute value of the chromatic aberration ΔfB of the total light-converging optical system is controlled equal to or less than 0.15 μm/nm. Further, it is preferable that there is provided a diffractive structure for correcting chromatic aberration depending on the focal length of the objective lens.

It is also preferable that the wavelength of λ1 and the wavelength of λ2 satisfy the relationship of 1.5λ1≦λ2≦1.75 λ1.

Figure 2A:
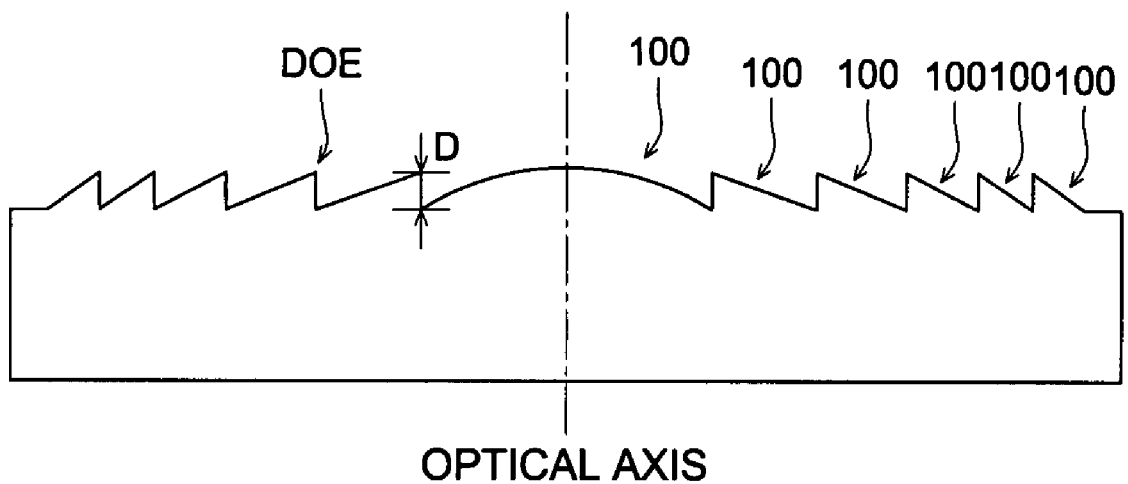
FIGS. 2(a) and 2(b) illustrate cross sectional views of diffractive structures.
Figure 2B:
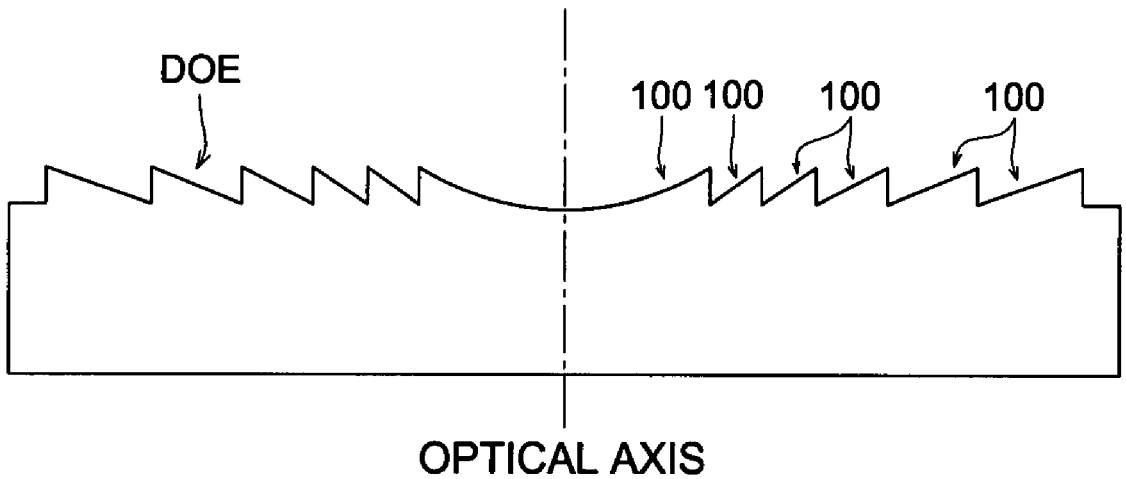
Figure 3:
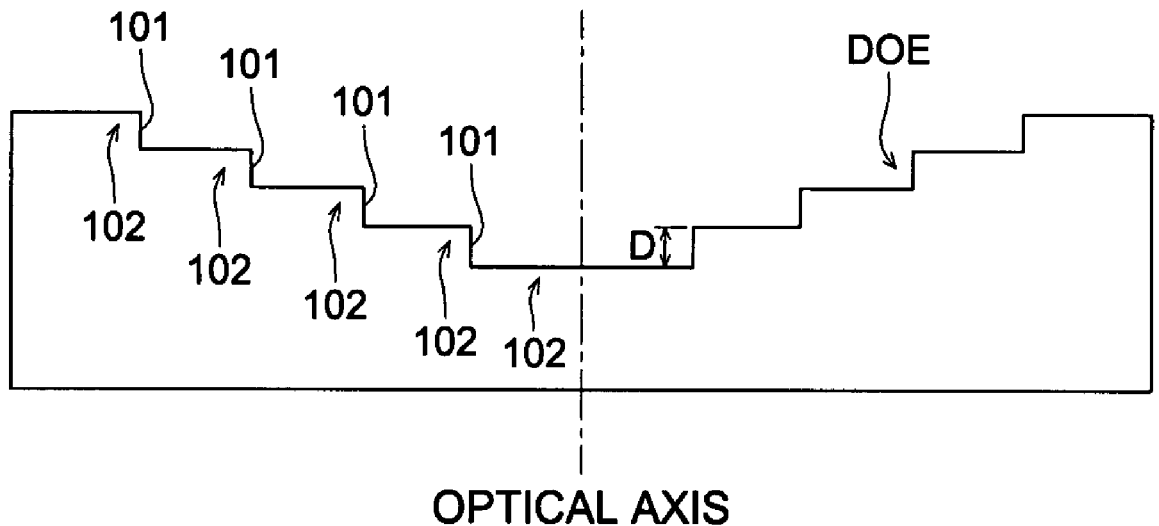
FIGS. 3(a) and 3(b) illustrate cross sectional views of diffractive structures.
Figure 3:
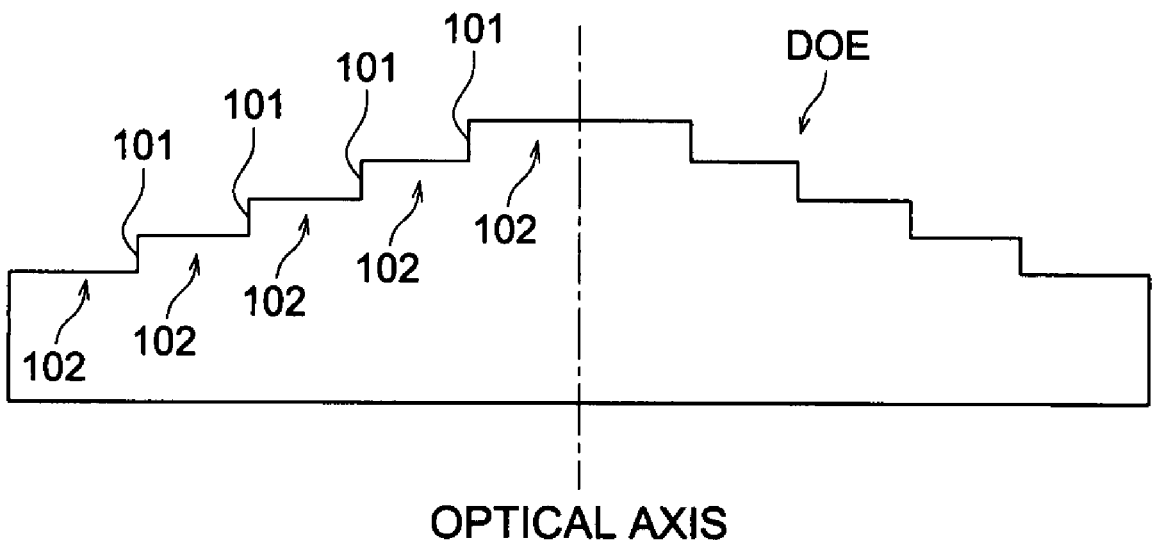
Figure 4:
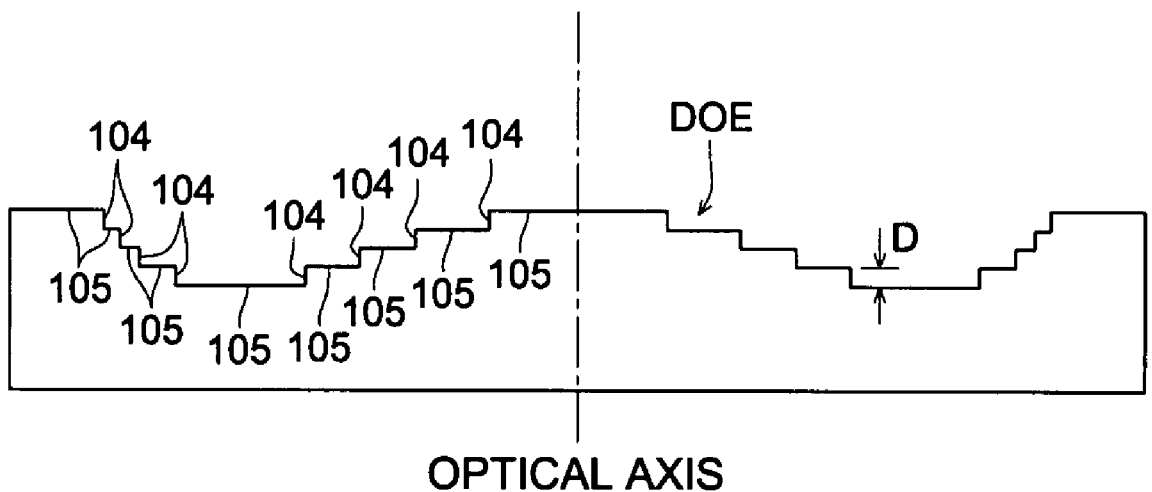
FIGS. 4(a) and 4(b) illustrate cross sectional views of diffractive structures.
Figure 4:
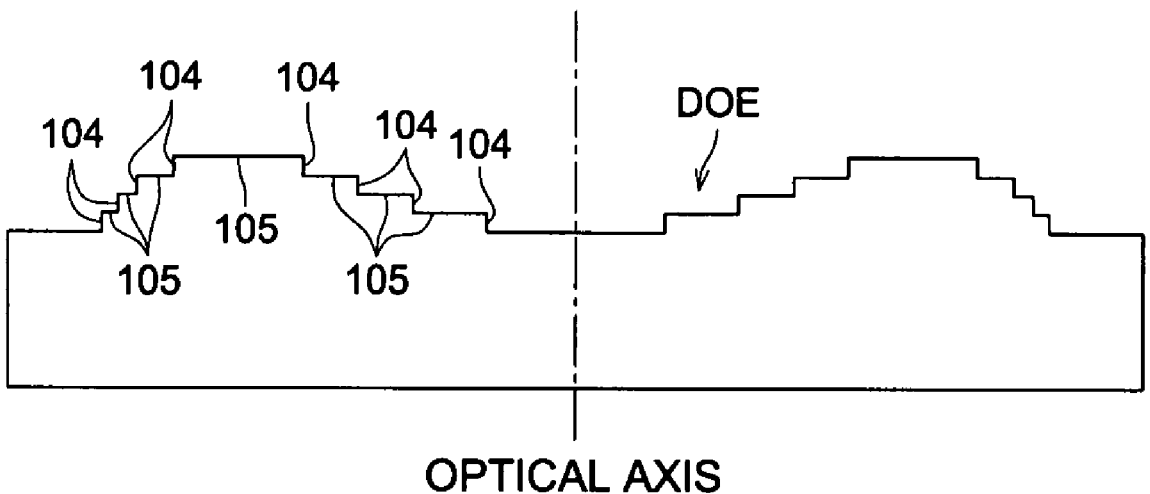
Figure 5A:
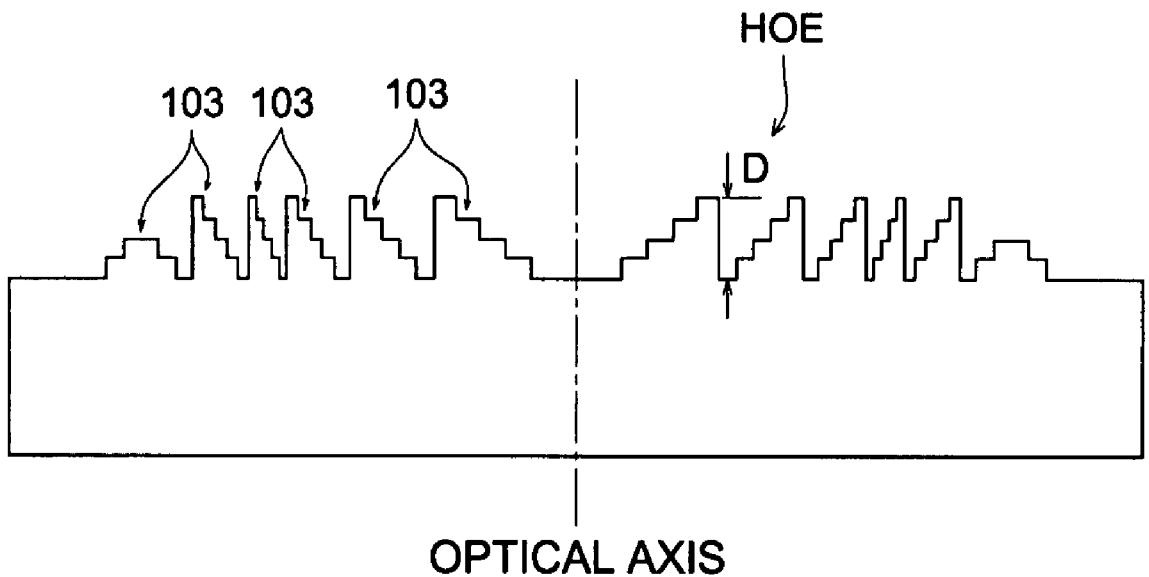
FIGS. 5(a) and 5(b) illustrate cross sectional views of diffractive structures.
Figure 5B:
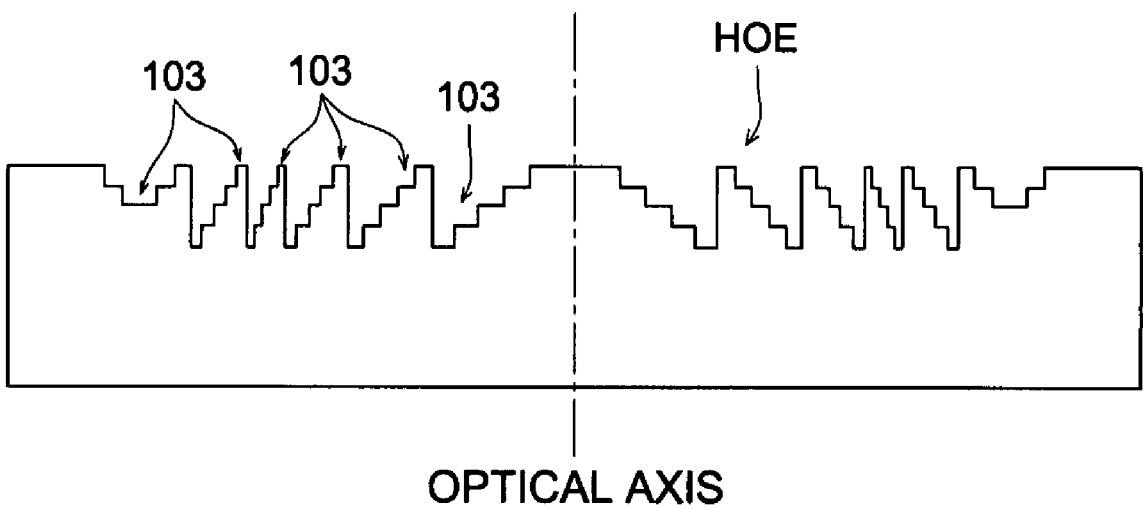

Here, the diffractive structure in the preferred embodiment is described referring to FIGS. 2(a) to 5(b). Each of FIGS. 2(a) to 5(b) shows a cross section of an example of the diffractive structure, which is taken on a plane including the optical axis. Examples of the diffractive structure includes: a structure including a plurality of ring-shaped zones 100 and having a cross-sectional form including the optical axis in a serrated shape as schematically shown in FIGS. 2(a) and 2(b), which is diffractive structure DOE; a structure including a plurality of ring-shaped zones 102 each having a step 101 extending in the same direction within the effective diameter and having a cross-sectional form including the optical axis in a stepped shape as schematically shown in FIGS. 3(a) and 3(b), which is diffractive structure DOE; a structure including a plurality of ring-shaped zones 105 each having a step 104 whose extending direction switches at a position within the effective diameter and having a cross-sectional form including the optical axis in a stepped shape as schematically shown in FIGS. 4(a) and 4(b), which is diffractive structure DOE; and a structure including a plurality of ring-shaped zones 103 each having a stepwise structure as shown schematically in FIGS. 3(a) and 3(b), which is diffractive structure HOE.

In the meanwhile, each of FIGS. 2(a) through 5(b) schematically shows an example in which the diffractive structure is formed on a flat surface. However, each diffractive structure may also be formed on a spherical surface or an aspherical surface.

In these diffractive structures, each of the ring-shaped zones is concentrically arranged around the optical axis and has a step difference extending along the optical axis. The depth of each ring-shaped zone is represented by the amount D of a step.

It is preferable that, in the optical pickup apparatus according to the present invention, the plurality of ring-shaped zones of the first diffractive structure have the steps with an average step-amount dCPL (μm) satisfying the following expression (4).

$$\lambda 1 \times 2/(n1-1) \times 0.95 \leq dCPL \leq \lambda 1 \times 2/(n1-1) \times 1.3 \qquad (4)$$

Where, n1 is a refractive index of a material forming the first diffractive structure for a light flux with the wavelength λ1.

When designing the first diffractive structure so as to satisfy the expression (4), if the first optical information recording medium is a high-density optical disc and the second optical information disc is a DVD, the intensity of the second order diffraction light flux generated from the light flux with the wavelength of λ1 becomes the highest level and the intensity of the first order diffraction light flux generated from the light flux with the wavelength of λ2 becomes the highest level. Accordingly, using the lower order diffraction light fluxes allows to control the light utilization efficiency in a high level in any wavelength of the light fluxes and to minimize the fluctuation of the diffractive structure efficiency caused by wavelength change and the temperature change. The average step-amount dCPL denotes an average value of the step amount D of all the steps in the diffractive structure. Namely, the average step-amount dCPL is a value calculated by dividing the sum of the amounts D of steps structured on the coupling lens by the number of the steps. The diffractive structure on the coupling lens is formed even on the area, through which a light flux does not pass in a basic usage condition. The reason is that the coupling lens is stably arranged in the optical pickup apparatus and light fluxes can be guided, through the stable coupling lens, to all area within the diaphragm of the objective lens even though the objective lens shifts by the tracking operation. Accordingly, it is preferable that the entire of the diffractive structure formed on the coupling lens should be the first diffractive structure.

It is preferable that the optical pickup apparatus according to the present invention, further includes: a third light source for emitting a third light flux with a wavelength λ3 (nm) satisfying λ2<λ3, and the light-converging optical system is adopted to converge a light flux from the third light source onto an information recording surface of a third optical information recording medium through a protective layer with a thickness t3 (t2<t3) so that information can be recorded and/or reproduced for the third optical information recording medium. Then, it is preferable that the objective lens comprises a second diffractive structure arranged on an area on the objective lens where the first light flux, the second light flux, and the third light flux respectively used for recording or reproducing information on the first information recording medium, the second optical information recording medium, and the third optical information recording medium, pass through. It is preferable that the second diffractive structure includes a plurality of ring-shaped zones which are concentrically arranged around the optical axis and have steps extending along the optical axis, and the plurality of ring-shaped zones of the second diffractive structure have the steps with an average step-amount dOBL (μm) satisfying the following expression (5).

$$\lambda 1 \times 2/(n2-1) \times 0.95 \leq dOBL \leq \lambda 1 \times 2/(n2-1) \times 1.3 \qquad (5)$$

Where, n2 is a refractive index of a material forming the second diffractive structure for a light flux with the wavelength λ1.

When designing the second diffractive structure so as to satisfy the expression (5), if the first optical information recording medium is a high-density optical disc, the second optical information disc is a DVD and the third optical information recording medium is a CD, the intensity of the second order diffraction light flux generated from the light flux with the wavelength of λ1 becomes the highest level, the intensity of the first order diffraction light flux generated from the light flux with the wavelength of λ2 becomes the highest level and the intensity of the first diffraction light flux generated from the light flux having wavelength of λ3 becomes the highest level. Accordingly, using the lower order diffraction light fluxes allows to control the light utilization efficiency in a high level in any wavelength of the light and to minimize the diffractive structure efficiency fluctuation caused by wavelength change and the temperature change. The average step-amount dOBJ denotes an average value of the step amount D of the diffractive structure which formed in an area where light fluxes with the wavelengths satisfying the description about the above-described first embodiment including the expressions (1) through (3B) commonly pass through. When the light flux with the wavelength λ3 does not satisfy the description about the embodiment, the average step-amount dOBJ is the average of the step amount of the steps in the diffractive structure arranged on an area where transmits the light fluxes with the wavelength λ1 and λ2. Alternatively, the light flux with the wavelength λ3 satisfies the description about the embodiment, the average step-amount dOBJ is the average of the step amount of the steps in the diffractive structure arranged on an area where transmits the light fluxes with three wavelengths which are used for recording and/or reproducing information on the optical information recording media.

It is preferable that, the optical pickup apparatus satisfies the following expression (6) and the coupling lens comprises at least one optical element whose position on the optical axis differs between when information is recorded and/or reproduced for the first optical information recording medium and when information is recorded and/or reproduced for the second information recording medium.

$$0 \text{ (mm)} \leq |L1-L2| \leq 0.5 \text{ (mm)} \tag{6}$$

Where, L1 (mm) is an optical path length from the first light source to a surface of the first optical information recording medium, which faces the first light source, and L2 (mm) is an optical path length from the second light source to a surface of the second optical information recording medium, which faces the second light source.

According to this embodiment of the present invention, the at least one optical element is located at the different positions between when information is recorded and/or reproduced for the first optical information recording medium and when information is recorded and/or reproduced for the second information recording medium. Therefore, it allows the at least one optical element to emit light fluxes from the light sources each of which are located at the same distance from the corresponding optical information recording media (a light source side surface) as light fluxes having different divergent angles corresponding to the optical magnifications of the objective lens defined by the expression (2). Accordingly, by substantially coinciding the optical path lengths from the respective light sources to the surfaces of the corresponding optical information recording media, which face the objective lens, it allows the same optical detector to receive reflected light fluxes from the first optical information recording medium and the second optical information recording medium and to use the optical detector as a common member.

It is preferable that, in the optical pickup apparatus according to the present invention, the objective lens is a single lens satisfying the following expression (7).

$$1.8 \text{ (mm)} \leq f_{OBJ} \leq 3.5 \text{ (mm)} \tag{7}$$

It is preferable that, in the optical pickup apparatus according to the present invention, the coupling lens comprises two optical elements. In the optical pickup apparatus, a moving distance of the optical elements required for realizing the compatibility is reduced, by distributing the lens power among the optical elements. Therefore, it saves the size of the optical pickup apparatus and the electric power.

In this specification, an objective lens denotes a lens which has a light-conversing function, and which is placed so as to be opposed to an optical information recording medium at the closest position to the optical information recording medium under the condition that the optical information recording medium is installed into the optical pickup apparatus. Alternatively, an objective lens denotes a group of optical elements including the objective lens denoted above; and an optical element with light-converging function or a lens, which is attached onto the actuator with the objective lens denoted above to be driven integrally together as one body. Namely, an objective lens is preferably a single lens but may include a plurality of optical elements.

According to the present invention, an optical pickup apparatus, which is capable of appropriately recording/reproducing information for different optical media can be provided while commonly using an objective lens and a coupling lens.

Embodiments of the present invention will be described by referring to drawings hereinafter. FIG. 1 illustrates a schematic diagram of optical pickup apparatus PU1 of an embodiment of the present invention, which is capable of appropriately recording/reproducing information for different optical information recording media (they will be called optical discs), which are HD, DVD and CD. This optical pickup apparatus PU1 can be installed into an optical information recording reproducing apparatus.

The optical pickup apparatus PU1 comprises a first semiconductor laser LD1, a second semiconductor laser LD2, a third semiconductor laser LD3, an optical detector PD, a coupling lens CUL, an objective lens OBJ, a polarized beam splitter PBS, a first dichroic prism DP1, a second dichroic prism DP2, a λ/4 wavelength plate QWP; and a sensor lens SN. The first semiconductor laser LD1 is provided for emitting a blue-violet laser light flux (the first light flux) with wavelength of λ1=406 nm emitted for recording/reproducing information onto or from HD, which is a high density optical disc. A blue-violet SHG laser can also be used for the light source for HD instead of the semiconductor laser LD1. The second semiconductor laser LD2 is provided for emitting a red laser light flux (the second light flux) with wavelength of λ2=660 nm emitted for recording/reproducing information onto or from DVD. The third semiconductor laser LD3 is provided for emitting infrared laser light flux (the third light flux) having wavelength of λ3=783 nm emitted for recording/reproducing information onto or from CD. The optical detector PD is compatibly used for HD/DVD/CD. The objective lens OBJ has a function for converging the incident laser light flux onto the information recording surface of an optical disc, and includes a predetermined diffractive structure. The objective lens OBJ is a plastic single lens. The polarized beam splitter PBS is a splitting device for splitting light flux. The sensor lens SN is provided for adding astigmatism to the reflected light flux from the optical disc.

In the present embodiment, the coupling lens CUL comprises a concave lens LS1 and a convex lens LS2. The concave lens LS1 is arranged movably in the optical axis direction corresponding to the optical disc to be used. The coupling lens is configured so as to change an angle of the emitted light flux corresponding to the wavelength of the incident light flux by changing the position of the movable lens in the optical axis direction. The diffractive structure is formed on the optical surface of the concave lens LS2. An optical path length L1 from the first semiconductor laser LD1 to the surface facing the light source of HD, an optical path length L2 from the second semiconductor laser LD2 to the surface facing the light source of DVD and an optical path length L3 from the third semiconductor laser LD3 to the surface facing the light source of CD are equal, or differ to each other with their difference being not more than 0.5 mm.

When recording/reproducing information onto or from the HD, in the optical pickup apparatus PU1, the first semiconductor laser LD1 is turned on to emit the laser light flux. The divergent light flux emitted from the first semiconductor laser LD1 passes through the first dichroic prism DP1, the second dichroic prism DP2 and the polarization beam splitter PBS. Then the divergent light flux emitted from the first semiconductor laser LD1 is converted into predetermined converging light flux by the coupling lens CUL and passes through the λ/4 wavelength plate QWP. The diameter of the light flux is regulated by a diaphragm (not shown). Then the objective lens forms the regulated light flux into a light spot on the information recording surface through the protective layer of the HD. A bi-axial actuator (not shown) provided around the objective lens drives the objective lens to conduct a focusing operation and a tracking operation.

The light flux is reflected and modulated by the information pits on the information recording surface of HD, and passes back through the objective lens OBJ, the λ/4 wavelength plate QWP and the coupling lens CUL. Then the reflected light flux modulated by the information pits on the information recording surface of HD is reflected by the polarized beam splitter PBS. The sensor lens SN gives astigmatism to the reflected light flux. Then the reflected light flux is converged onto the light-receiving surface of the optical detector PD. The information recorded on the HD is read out by using the output signal of the optical detector PD.

When recording/reproducing information onto or from the DVD, in the optical pickup apparatus PU1, the second semiconductor laser LD2 is turned on to emit laser light flux. The divergent light flux emitted from the second semiconductor laser LD2 is reflected by the first dichroic prism DP1, and passes through the second dichroic prism DP2 and the polarization beam splitter PBS. Then the divergent light flux emitted from the second semiconductor laser LD2 is converted into any one of predetermined infinite light flux, divergent light flux and converging light flux by the coupling lens CUL and passes through the λ/4 wavelength plate QWP. The diameter of the light flux is regulated by a diaphragm (not shown). Then the objective lens forms the regulated light flux into a light spot on the information recording surface through a protective layer of the DVD. The bi-axial actuator (not shown) provided around the objective lens drives the objective lens to conduct a focusing operation and a tracking operation.

The light flux is reflected and modulated by the information pits on the information recording surface of DVD and passes back through the objective lens OBJ, the λ/4 wavelength plate QWP and the coupling lens CUL again. Then the reflected light flux modulated by the information pits on the information recording surface of DVD is reflected by the polarized beam splitter PBS. The sensor lens SN gives astigmatism to the reflected light flux. Then the reflected light flux is converged onto the light-receiving surface of the optical detector PD. The information recorded on the DVD is read out by using the output signal of the optical detector PD.

When recording/reproducing information onto or from the CD, in the optical pickup apparatus PU1, the third semiconductor laser LD3 is turned on to emit laser light flux. Then divergent light flux emitted from the third semiconductor laser LD3 is reflected by the second dichroic prism DP2. Then the divergent light flux emitted from the third semiconductor laser LD3 is converted into predetermined divergent light flux by the coupling lens CUL and passes through the λ/4 wavelength plate QWP. The diameter of the light flux is regulated by a diaphragm (not shown). Then the objective lens forms the regulated light flux into a light spot on the information recording surface through the protective layer of the CD. A bi-axial actuator (not shown) provided around the objective lens drives the objective lens to conduct a focusing operation and a tracking operation.

The light flux is reflected and modulated by the information pits on the information recording medium of CD and passes back through the objective lens OBJ, the λ/4 wavelength plate QWP and the coupling lens CUL again. Then the reflected light flux modulated by the information pits on the information recording surface of CD is reflected by the polarized beam splitter PBS. The sensor lens SN gives astigmatism to the reflected light flux. Then the reflected light flux is converged onto the light-receiving surface of the optical detector PD. The information recorded on the CD is read out by using the output signal of the optical detector PD. The semiconductor lasers LD1 through LD3 may be configured into one package to form a so-called three laser in one package. In this case, the dichroic prism becomes unnecessary.

EXAMPLES

Preferable examples of the embodiment described above will be described below. Hereinafter (including the lens data in the tables), the power of 10 will be expressed as by using "E". For example, $2.5 \times 10^{-3}$ will be expressed as 2.5E−3.

Each of optical surfaces of the objective lens is formed as an aspherical surface, which has a symmetric shape around the optical axis with defined by substituting the coefficients shown in the tables described later into the expression 10.

$$Z=(y^2/r)/(1+\sqrt{1-(K+1)(y/r)^2})+A_4 y^4+A_6 y^6+A_8 y^8+A_{10} y^{10}+A_{12} y^{12}+A_{14} y^{14}+A_{16} y^{16}+A_{18} y^{18}+A_{20} y^{20} \quad (10)$$

Where Z denotes an aspherical surface shape (the distance along the optical axis from a flat plane contacting with a surface vertex of the aspherical surface), y denotes the distance from the optical axis, r denotes a radius of curvature, K denotes a conic constant and $A_4, A_6, A_8, A_{10}, A_{12}, A_{14}, A_{16}, A_{18}, A_{20}$ denote aspherical surface coefficients.

The diffractive structure provides the optical path difference with the light fluxes of respective wavelengths, which is defined by substituting the coefficients shown in the tables shown later into the expression 11.

$$\phi = dor \times \lambda/\lambda_B \times (C_2 y^2 + C_4 y^4 + C_6 y^6 + C_8 y^8 + C_{10} y^{10}) \quad (11)$$

Where, φ denotes an optical path difference function, λ denotes the wavelength of the light flux entering to a diffractive structure, $\lambda_B$ denotes a blaze wavelength, dor denotes the diffraction order of the diffracted light flux used for recording and/or reproducing information for an optical disc, y denotes the distance from the optical axis and $C_2, C_4, C_6, C_8, C_{10}$ denote coefficients of the an optical path difference function.

Example 1

The lens data of Example 1 will be shown in Table 1. In Table 1, the fifth surface and the eighth surface denote surfaces virtually provided because of the necessity for the lens design. The first diffractive structure is provided on the seventh surface and the second diffractive structure is provided on the tenth surface.

TABLE 1

Example 1

| The i-th surface | ri | di (406 nm) | ni (406 nm) | di (660 nm) | ni (660 nm) | di (783 nm) | ni (783 nm) | Optical element name |
|---|---|---|---|---|---|---|---|---|
| 0 | ∞ | 0.00 | | 0.00 | | 0.00 | | |
| 1 | ∞ | 5.75 | 1.6191 | 5.75 | 1.5772 | 5.75 | 1.5707 | Beam |
| 2 | ∞ | 12.28 | 1.0 | 12.28 | 1.0 | 12.28 | 1.0 | splitter |
| 3 | −7.0951 | 0.80 | 1.5586 | 0.80 | 1.5392 | 0.80 | 1.5359 | Doublet |
| 4 | −16.6651 | 0.00 | 1.0 | −0.85 | 1.0 | −3.55 | 1.0 | coupling |
| 5 | ∞ | 4.80 | | 4.80 | | 4.80 | | lens |
| 6 | 66.3213 | 1.20 | 1.5586 | 1.20 | 1.5392 | 1.20 | 1.5359 | |
| 7 | −14.3835 | 0.00 | 1.0 | 0.67 | 1.0 | 3.63 | 1.0 | |
| 8 | ∞ | 20.70 | | 20.70 | | 20.70 | | |
| 9 (Diaphragm diameter) | ∞ | 0.00 | | 0.00 | | 0.00 | | |
| 10' | 1.9511 | 0.03127 | 1.5586 | 0.03127 | 1.5392 | 0.03127 | 1.5359 | Objective |
| 10 | 1.8632 | 1.76 | 1.5586 | 1.76 | 1.5392 | 1.76 | 1.5359 | lens |
| 11 | −12.0942 | 1.60 | 1.0 | 1.78 | 1.0 | 1.52 | 1.0 | |
| 12 | ∞ | 0.60 | 1.6191 | 0.60 | 1.5772 | 1.20 | 1.5707 | Disc |
| 13 | ∞ | 0.00 | 1.0 | 0.00 | 1.0 | 0.00 | 1.0 | |
| 14 | ∞ | 0.00 | | 0.00 | | 0.00 | | |

* di' denotes the distance from the i-th surface to the i'-th surface

The 7th surface
Aspherical surface coefficient

| | |
|---|---|
| κ | −1.0014E+00 |
| A4 | 1.5121E−05 |

The 10'th surface (1.409 mm < y)
Aspherical surface coefficient

| | |
|---|---|
| κ | −4.2557E−01 |
| A4 | −1.1810E−03 |
| A6 | 1.6648E−03 |
| A8 | −1.9253E−04 |
| A10 | −1.6937E−04 |
| A12 | 4.6103E−05 |
| A14 | −4.9919E−06 |

The 10th surface (0 mm ≦ y ≦ 1.409 mm)
Aspherical surface coefficient

| | |
|---|---|
| κ | −5.9308E−01 |
| A4 | −3.0783E−04 |
| A6 | 1.5885E−03 |
| A8 | −3.7596E−04 |
| A10 | 1.0870E−05 |
| A12 | 1.0579E−05 |
| A14 | −1.9065E−06 |

The 11th surface
Aspherical surface coefficient

| | |
|---|---|
| κ | −5.2454E+01 |
| A4 | 9.7665E−03 |
| A6 | −8.4995E−04 |
| A8 | −5.4372E−04 |
| A10 | 1.4356E−04 |
| A12 | −1.3452E−05 |
| A14 | 3.2635E−07 |

Optical path difference function
(HD DVD: 2nd order DVD: 1st order CD: 1st order)

| | |
|---|---|
| λB | 395 nm |
| C2 | −6.4099E−03 |

Optical path difference function
(DVD: third order)

| | |
|---|---|
| λB | 660 nm |
| C2 | 2.4089E−03 |
| C4 | −7.6320E−04 |
| C6 | 2.4948E−04 |
| C8 | −8.1643E−05 |
| C10 | 7.8180E−06 |

Optical path difference function
(HD DVD: 2nd order DVD: 1st order CD: 1st order)

| | |
|---|---|
| λB | 395 nm |
| C2 | 2.0000E−03 |

TABLE 1-continued

| | Example 1 |
|---|---|
| C4 | −7.0920E−04 |
| C6 | 3.8180E−04 |
| C8 | −1.4861E−04 |
| C10 | 1.8106E−05 |

Example 2

The lens data of Example 2 will be shown in Table 2. In the Table 2, the fifth surface and the eighth surface denotes surfaces virtually provided because of the necessity for the lens design. The first diffractive structure is provided on the seventh surface.

TABLE 2

| | | | Example 2 | | | | |
|---|---|---|---|---|---|---|---|
| The i-th surface | ri | di (408 nm) | ni (4086 nm) | di (660 nm) | ni (660 nm) | di (784 nm) | ni (784 nm) | Optical element name |
| 0 | ∞ | 0.00 | | 0.00 | | 0.00 | | |
| 1 | ∞ | 5.75 | 1.6191 | 5.75 | 1.5772 | 5.75 | 1.5707 | Beam |
| 2 | ∞ | 6.19 | 1.0 | 6.19 | 1.0 | 6.19 | 1.0 | splitter |
| 3 | −3.4056 | 0.80 | 1.5583 | 0.80 | 1.5392 | 0.80 | 1.5359 | Doublet |
| 4 | −6.2060 | 0.00 | 1.0 | 0.45 | 1.0 | −3.49 | 1.0 | coupling |
| 5 | ∞ | 4.70 | | 4.70 | | 4.70 | | lens |
| 6 | 72.0824 | 1.20 | 1.5583 | 1.20 | 1.5392 | 1.20 | 1.5359 | |
| 7 | −9.3140 | 0.00 | 1.0 | −0.54 | 1.0 | 3.62 | 1.0 | |
| 8 | ∞ | 13.70 | | 13.70 | | 13.70 | | |
| 9 (Diaphragm diameter) | ∞ | 0.00 | | 0.00 | | 0.00 | | |
| 10' | 1.5094 | 0.01769 | 1.5583 | 0.01769 | 1.5392 | 0.01769 | 1.5359 | Objective |
| 10 | 1.4346 | 1.37 | 1.5583 | 1.37 | 1.5392 | 1.37 | 1.5359 | lens |
| 11 | −8.0506 | 1.03 | 1.0 | 1.12 | 1.0 | 0.90 | 1.0 | |
| 12 | ∞ | 0.60 | 1.6183 | 0.60 | 1.5772 | 1.20 | 1.5707 | Disc |
| 13 | ∞ | 0.00 | 1.0 | 0.00 | 1.0 | 0.00 | 1.0 | |
| 14 | ∞ | 0.00 | | 0.00 | | 0.00 | | |

*di' denotes the distance from the i-th surface to the i'-th surface

The 3rd surface
Aspherical surface coefficient

| | |
|---|---|
| κ | −8.8878E−01 |
| A4 | −2.7665E−03 |
| A6 | 1.4298E−04 |

The 7th surface
Aspherical surface coefficient

| | |
|---|---|
| κ | −2.7080E+00 |
| A4 | −2.9184E−04 |
| A6 | 2.7553E−06 |

The 10'th surface (1.409 mm < y)
Aspherical surface coefficient

| | |
|---|---|
| κ | −4.7277E−01 |
| A4 | 8.6546E−03 |
| A6 | 4.2994E−03 |
| A8 | 3.7199E−04 |
| A10 | −1.8676E−03 |
| A12 | 9.0899E−04 |
| A14 | −2.6354E−04 |

The 10th surface (0 mm ≦ y ≦ 1.409 mm)
Aspherical surface coefficient

| | |
|---|---|
| κ | −5.8539E−01 |
| A4 | 5.7072E−03 |
| A6 | 9.8369E−04 |
| A8 | 2.7092E−03 |
| A10 | −2.6766E−03 |
| A12 | 1.5051E−03 |
| A14 | −3.7321E−04 |

TABLE 2-continued

Example 2

Optical path difference function
(HD DVD: 2nd order DVD: 1st order CD: 1st order)

| | |
|---|---|
| λB | 395 nm |
| C2 | −7.1000E−03 |

Optical path difference function
(DVD: third order)

| | |
|---|---|
| λB | 660 nm |
| C2 | −3.5457E−04 |
| C4 | 6.5693E−04 |
| C6 | 5.2938E−04 |
| C8 | −3.5057E−04 |
| C10 | 7.2217E−06 |

The 11th surface
Aspherical surface coefficient

| | |
|---|---|
| κ | −1.3505E+01 |
| A4 | 2.9818E−02 |
| A6 | −3.7632E−03 |
| A8 | −4.8943E−03 |
| A10 | 1.3993E−03 |
| A12 | 5.9105E−05 |
| A14 | −6.8103E−05 |

The values related to the expressions (1)-(7) will be shown in Table 3.

TABLE 3

| | | | Example 1 | Example 2 |
|---|---|---|---|---|
| HD | Total system | Magnification | −0.141 | −0.141 |
| | | Chromatic aberration (μm/nm) | 0.05 | 0.06 |
| | Coupling lens | Focal length $f_{CPL}$ (mm) | 20.04 | 13.72 |
| | | Chromatic aberration $\Delta fB_{CPL}$ (μm/nm) | −39.02 | −23.12 |
| | Objective lens | Focal length $f_{OBL}$ (mm) | 3.10 | 2.30 |
| | | NA | 0.65 | 0.65 |
| | | Magnification | 0.035 | 0.005 |
| | | Chromatic aberration $\Delta fB_{OBL}$ (μm/nm) | 0.73 | 0.46 |
| DVD | Total system | Magnification | −0.128 | −0.132 |
| | | Chromatic aberration (μm/nm) | −0.09 | −0.09 |
| | Coupling lens | Focal length (mm) | 24.97 | 16.00 |
| | | Chromatic aberration (μm/nm) | −19.09 | 0.75 |
| | Objective lens | Focal length (mm) | 3.20 | 2.38 |
| | | NA | 0.65 | 0.65 |
| | | Magnification | 0.000 | 0.032 |
| | | Chromatic aberration (μm/nm) | 0.17 | 0.11 |
| CD | Total system | Magnification | −0.128 | −0.131 |
| | | Chromatic aberration (μm/nm) | −0.05 | −0.04 |
| | Coupling lens | Focal length (mm) | 27.30 | 20.96 |
| | | Chromatic aberration (μm/nm) | −13.22 | −0.17 |
| | Objective lens | Focal length (mm) | 3.23 | 2.39 |
| | | NA | 0.51 | 0.51 |
| | | Magnification | −0.029 | −0.033 |
| | | Chromatic aberration (μm/nm) | 0.13 | 0.07 |
| Others | | dOBL (μm) | 1.52 | * |
| | | dCPL (μm) (Average step-amount within effective radius) | 1.65 | 1.43 |
| | | $\Delta fB_{OBL}/f_{OBL}^2$ (nm$^{-1}$·μm$^{-1}$) | 7.6E−08 | 8.70E−08 |
| | | $(\Delta fB_{OBL}/f_{OBL}^2) + (\Delta fB_{CPL}/f_{CPL}^2)$ (nm$^{-1}$·μm$^{-1}$) | −2.12E−08 | −3.59E−08 |
| | | $vd_{OBL}, vd_{CPL}$ | 56 | 56 |

*: N/A, because the objective lens has a refractive surface.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical pickup apparatus comprising:
a first light source for emitting a first light flux with a wavelength λ1 (nm);
a second light source for emitting a second light flux with a wavelength λ2 (nm) satisfying λ1<λ2; and
a light-converging optical system comprising
a coupling lens and an objective lens,
the light-converging optical system being adopted to converge the first light flux onto an information recording surface of a first optical information recording medium through a protective layer with a thickness t1 so that information can be recorded and/or reproduced for the first optical information recording medium, and adopted to converge the second light flux onto an information recording surface of a second optical information recording medium through a protective layer with a thickness t2 (t1≦t2) so that information can be recorded and/or reproduced for the second optical information recording medium,
wherein the coupling lens comprises a first diffractive structure arranged on an area on the coupling lens where the first light flux and the second light flux respectively used for recording or reproducing information on the first information recording medium and the second optical information recording medium, pass through, and the first diffractive structure includes a plurality of ring-shaped zones which are concentrically arranged around the optical axis and which have steps extending along the optical axis, and wherein the optical pickup apparatus satisfies following expressions:

$$-4.0 \times 10^{-8} \ (nm^{-1} \cdot \mu m^{-1}) \leq (\Delta f B_{OBL}/f_{OBL}^2) + (\Delta f B_{CPL}/f_{CPL}^2) \leq -1.5 \times 10^{-8} \ (nm^{-1} \cdot \mu m^{-1}),$$

$$5.2 \times 10^{-8} \ (nm^{-1} \cdot \mu m^{-1}) \leq \Delta f B_{OBL}/f_{OBL}^2 \leq 1.0 \times 10^{-7} \ (nm^{-1} \cdot \mu m^{-1}),$$

$$50 \leq vd_{OBL} \leq 65, \text{ and}$$

$$50 \leq vd_{CPL} \leq 65,$$

where $\Delta f B_{OBL}$ is a chromatic aberration (μm/nm) of the objective lens for a light flux with the wavelength $\lambda 1$, $f_{OBL}$ is a focal length (μm) of the objective lens for a light flux with the wavelength $\lambda 1$, $\Delta f B_{CPL}$ is a chromatic aberration (μm/nm) of the coupling lens for a light flux with the wavelength $\lambda 1$, $f_{CPL}$ is a focal length (μm) of the coupling lens for the first light flux, $vd_{OBL}$ is a dispersion of the material of the coupling lens for line d, and $vd_{CPL}$ is a dispersion of the material of the coupling lens for line d.

2. The optical pickup apparatus of claim 1,
wherein the plurality of ring-shaped zones of the first diffractive structure have the steps with an average step-amount dCPL (μm) satisfying a following expression:

$$\lambda 1 \times 2/(n1-1) \times 0.95 \leq dCPL \leq \lambda 1 \times 2/(n1-1) \times 1.3,$$

where n1 is a refractive index of a material forming the first diffractive structure for a light flux with the wavelength $\lambda 1$.

3. The optical pickup apparatus of claim 1, further comprising:
a third light source for emitting a third light flux with a wavelength $\lambda 3$ (nm) satisfying $\lambda 2 < \lambda 3$,
wherein the light-converging optical system is further adopted to converge the third light flux onto an information recording surface of a third optical information recording medium through a protective layer with a thickness t3 (t2<t3) so that information can be recorded and/or reproduced for the third optical information recording medium, and wherein the objective lens comprises a second diffractive structure arranged on an area on the objective lens where the first light flux, the second light flux, and the third light flux respectively used for recording or reproducing information on the first information recording medium, the second optical information recording medium, and the third optical information recording medium, pass through, and the second diffractive structure includes a plurality of ring-shaped zones which are concentrically arranged around the optical axis and have steps extending along the optical axis, and the plurality of ring-shaped zones of the second diffractive structure have the steps with an average step-amount dOBL (μm) satisfying a following expression:

$$\lambda 1 \times 2/(n2-1) \times 0.95 \leq dOBL \leq \lambda 1 \times 2/(n2-1) \times 1.3$$

where n2 is a refractive index of a material forming the second diffractive structure for a light flux with the wavelength $\lambda 1$.

4. The optical pickup apparatus of claim 1,
wherein the optical pickup apparatus satisfies a following expression and
the coupling lens comprises at least one optical element whose position on the optical axis differs between when information is recorded and/or reproduced for the first optical information recording medium and when information is recorded and/or reproduced for the second information recording medium:

$$0 \ (mm) \leq |L1-L2| \leq 0.5 \ (mm),$$

where L1 (mm) is an optical path length from the first light source to a surface of the first optical information recording medium, which faces the first light source, and L2 (mm) is an optical path length from the second light source to a surface of the second optical information recording medium, which faces the second light source.

5. The optical pickup apparatus of claim 1,
wherein the objective lens is a single lens satisfying a following expression:

$$1.8 \ (mm) \leq f_{OBL} \leq 3.5 \ (mm).$$

6. The optical pickup apparatus of claim 1,
wherein the coupling lens comprises two optical elements.

* * * * *